July 15, 1952   T. SWANN   2,603,561
METHOD AND APPARATUS FOR REDUCING ORES
Filed April 11, 1951   4 Sheets-Sheet 4

INVENTOR.
THEODORE SWANN
BY
Jennings & Carter
ATTORNEYS

Patented July 15, 1952

2,603,561

UNITED STATES PATENT OFFICE 2,603,561

METHOD AND APPARATUS FOR REDUCING ORES

Theodore Swann, Birmingham, Ala.

Application April 11, 1951, Serial No. 220,396

19 Claims. (Cl. 75—40)

This invention relates to a method and apparatus for reducing ores and has for an object to provide such a method in which the burden is heated indirectly through a heat transfer wall in a furnace and in which the sensible heat from the combustion chamber is utilized to pre-heat the air for use in gas burners in the combustion chamber and also to pre-heat the ore burden.

A further object of my invention is to provide a method and apparatus of the character designated in which carbon-monoxide released from the reduction chamber and containing no free oxygen is utilized to at least partially reduce the ore before it enters the reduction chamber.

A further object of my invention is to provide a method and apparatus for reducing ores in which the spent reducing gases are burned in the combustion chamber for heating indirectly the burden within the reduction chamber.

A further object of my invention is to provide a method and apparatus for reducing ores in which a burden comprising the ore to be reduced, carbon and a suitable flux is continuously introduced into a spirally moving column of the same, while passing the reducing gases released from the reduction chamber countercurrent to, and in intimate contact with, the burden prior to the entry of the burden into the reduction chamber.

A further object of my invention is to provide apparatus for reducing ore in which the combustion chamber is separated from the reduction chamber by a thin refractory wall thus permitting a better transfer of heat between the chambers.

A still further object of my invention is to provide apparatus for reducing ore in which the ore burden is continuously introduced into the reduction chamber through a centrally disposed conduit in a rotary chamber having a screw conveyer extending therethrough, and an annular chamber surrounding the centrally disposed conduit for passing the products of combustion countercurrent to and out of direct contact with the moving burden.

Apparatus for carrying out my improved process and which also illustrates the constructional features of my invention is shown in the accompanying drawings forming a part of this application in which.

Figure 1:
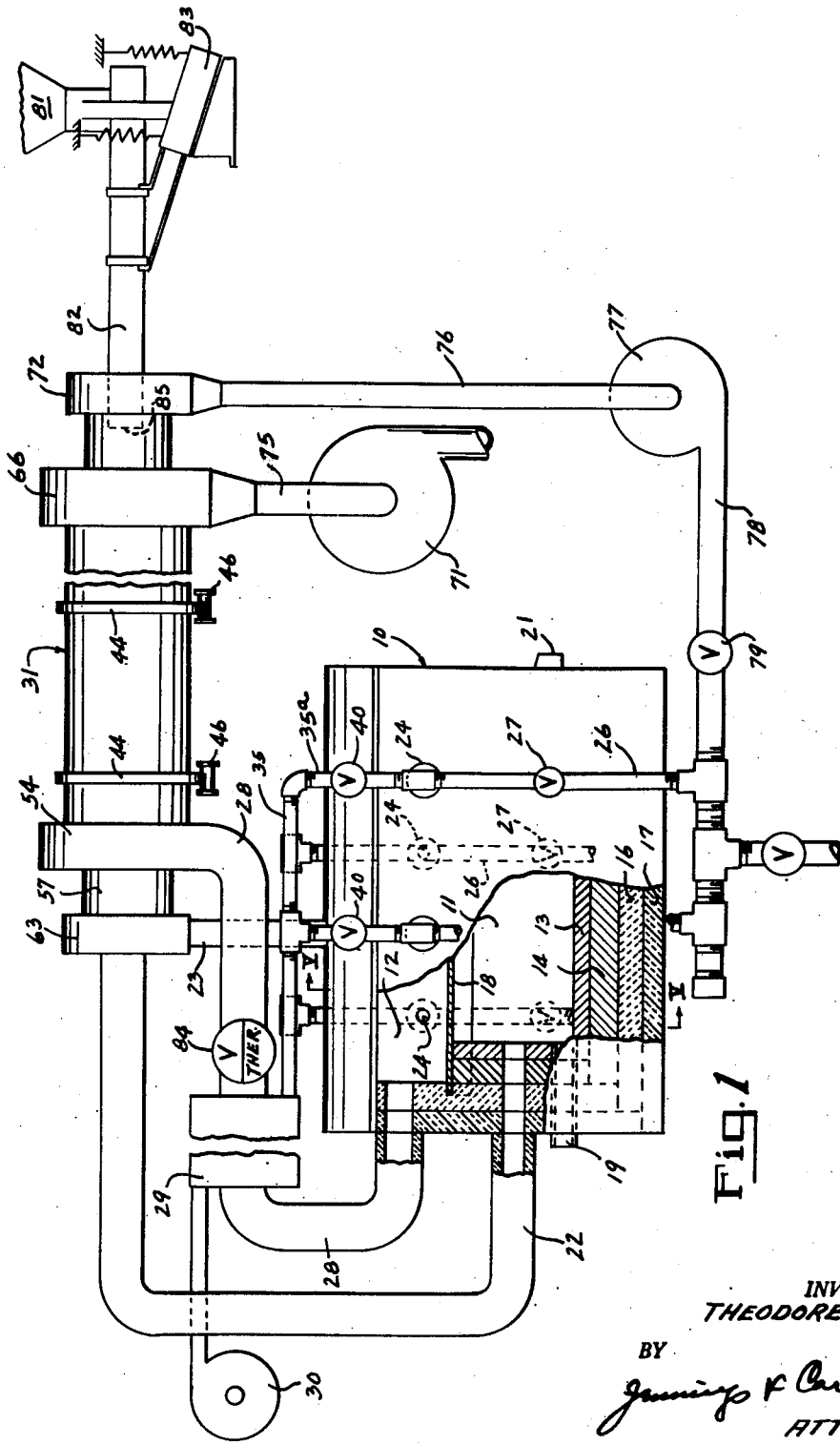
Fig. 1 is a diagrammatic elevational view of the apparatus partly broken away and in section.
Figure 2:
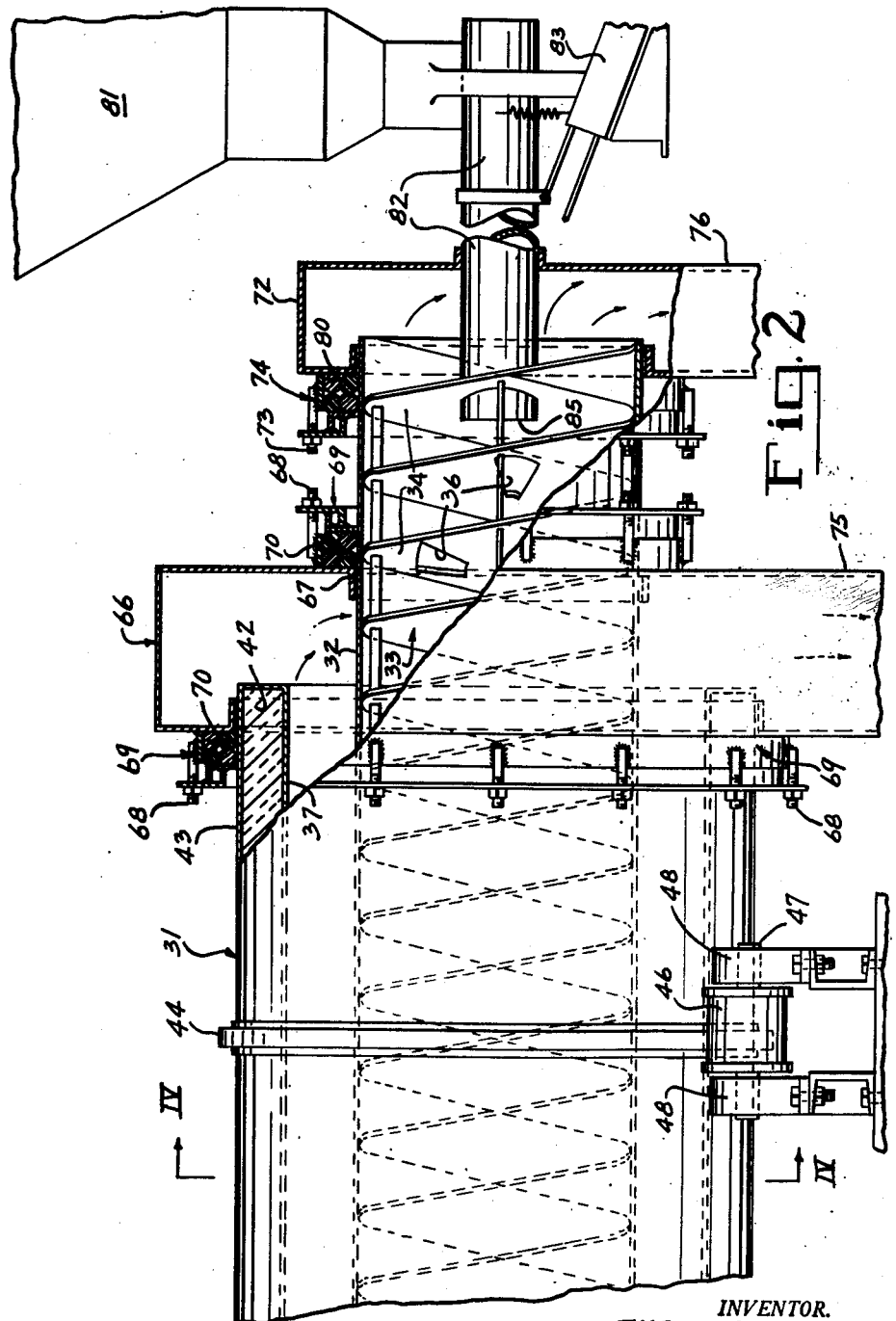
Fig. 2 is an enlarged elevational view of the feed end of the preheating portion of the apparatus partly broken away and in section.
Figure 3:
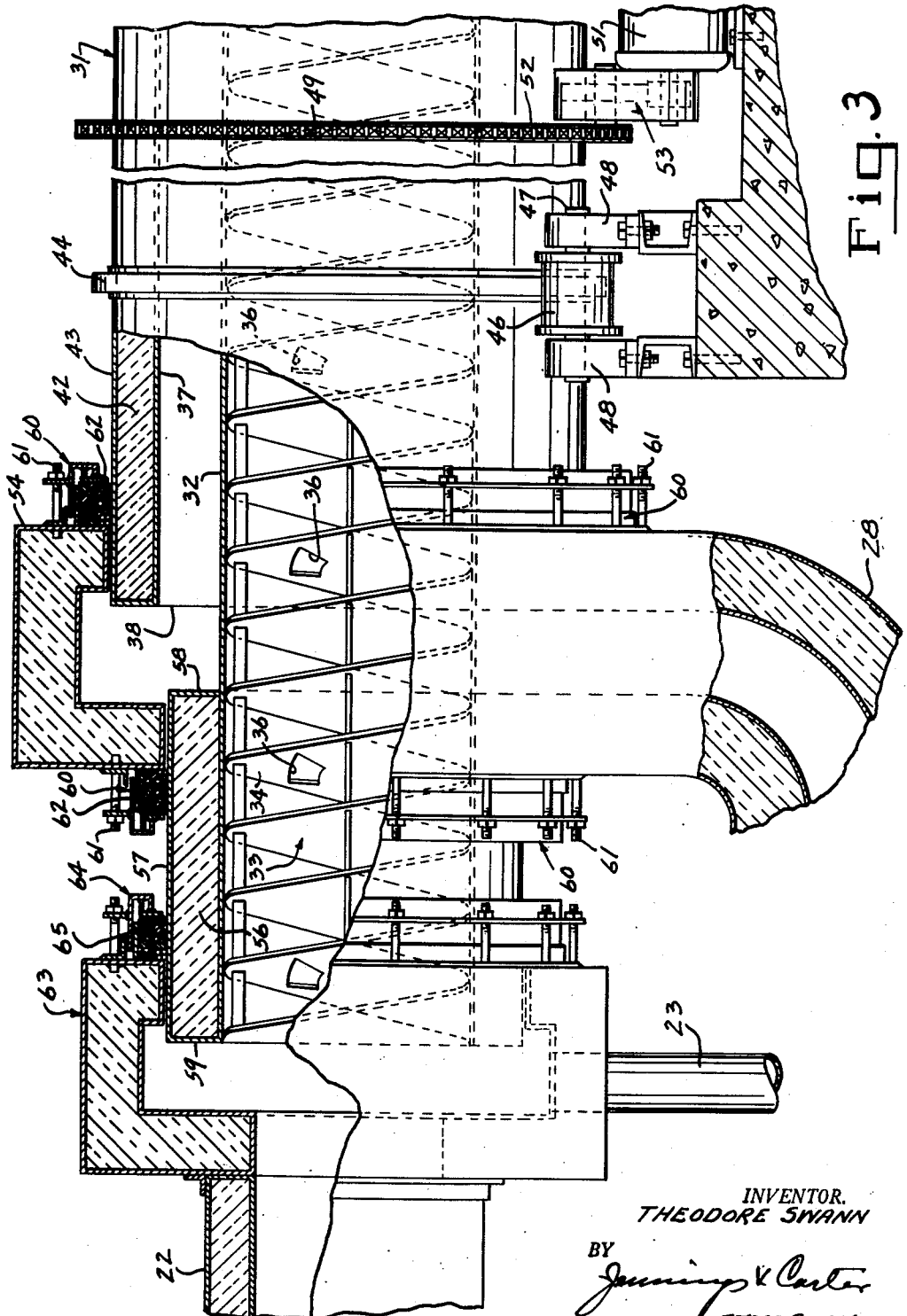
Fig. 3 is an enlarged sectional view of the discharge end of the preheating portion of the apparatus.

Referring now to the drawing for a better understanding of my invention, I show a smelting furnace indicated generally by the numeral 10. The smelting furnace comprises a reducing chamber 11 and a combustion chamber 12 positioned above the reducing chamber. The reducing chamber preferably has a graphite inner lining 13 to provide an even distribution of the heat within the chamber. Outwardly of the graphite lining 13 is a layer of carbon 14 for heat storage. Surrounding the layer of carbon 14 is a layer of refractory material 16 and surrounding the refractory material 16 is an outer layer of insulation material 17. The reduction chamber 11 is provided with a thin arch shaped roof 18 of silicon carbide or other suitable refractory which separates it from the combustion chamber. Preferably, the silicon carbide roof is approximately ¾ of an inch in thickness in its thin sections thus providing for the maximum transfer of heat between the combustion chamber and the burden within the reduction chamber.

Adjacent one end of the smelting furnace 10 and communicating with the lower portion of the reducing chamber 11 is a run out trough 19 for removing the molten metal. Also communicating with the reducing chamber 11 is the usual peep hole 20 and a slag run out trough 21. Communicating with the upper portion of the reduction chamber 11 is a conduit 22 for removing gases containing carbon-monoxide and carbon-dioxide released by the reaction within the chamber 11.

The combustion chamber 12 is provided with an arch shaped roof spaced from the silicon carbide roof 18 and is lined with the high temperature refractory material 16. The combustion chamber also has an outer covering of insulation material 17. Extending downwardly through the combustion chamber and the roof 18 is a conduit 23 for introducing the burden into the reduction chamber. Extending inwardly from each side of the combustion chamber and longitudinally spaced from each other are a plurality of burners 24 for burning a suitable hydrocarbon fuel such as gas. Communicating with the gas burners 24 are fuel supply conduits 26 having regulating valves 27 therein.

Also communicating with the combustion chamber 12 is a conduit 28 for removing the products of combustion therefrom. The conduit 28 communicates with a pre-heater 29 of any approved design which pre-heats the air supplied to the burners 24. Air is forced through the pre-heater 29 by means of a blower 30 and passes from the preheater through a conduit 35 and thence through suitable branch conduits 35a to the burners 24. Air regulating valves 40 regulate the supply of air to the burners.

Mounted above the smelting furnace 10 is a combined heat exchanger and conveyer 31 which comprises a rotary cylindrical tube 32 having rigidly secured therein an archimedian screw 33. The screw has flights 34 on a pitch of approximately 6 inches thus permitting the material conveyed by the screw to be mixed and dropped twice for each foot of travel. Staggered openings or slits 36 are provided in the flights for a purpose to be discussed hereinafter.

Surrounding the cylindrical tube 32 is a second tube 37. Extending longitudinally between the tubes 32 and 37 and joined thereto are a plurality of radial fins 38 defining flue ducts 39. The tube 37 is supported from the tube 32 by means of channel members 41. Surrounding the cylindrical tube 37 is a layer of insulation material 42 which is incased by an outer wall 43 thus practically eliminating all loss of heat by radiation.

Figure 4:
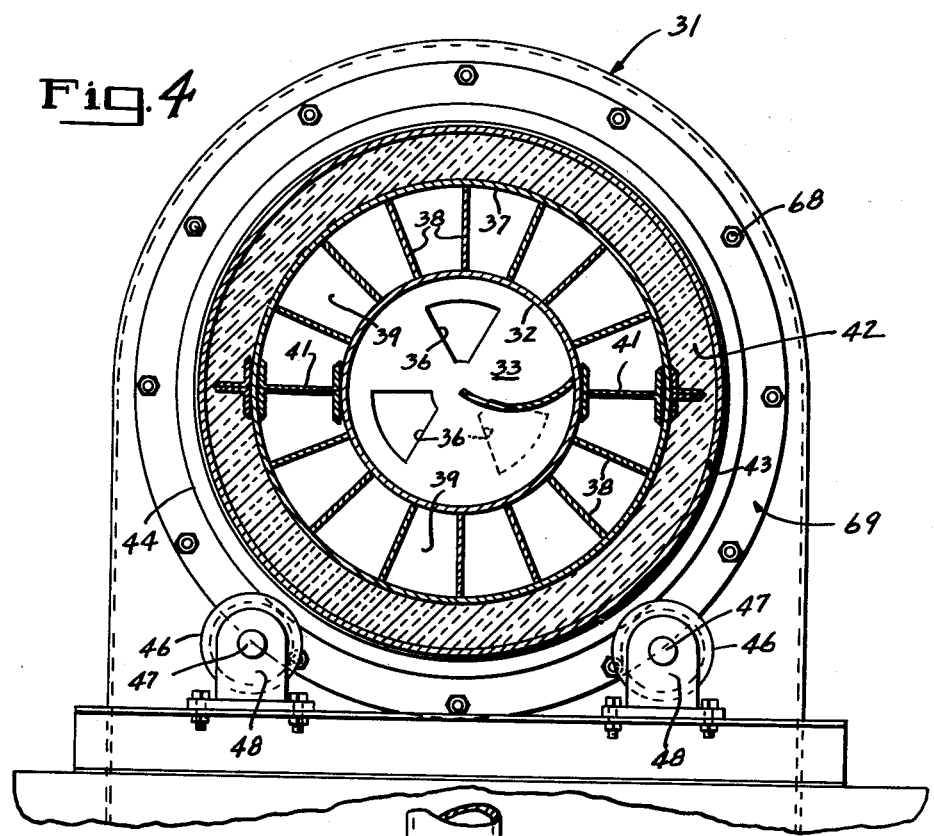
Fig. 4 is a sectional view taken along the line IV—IV of Fig. 2.
Figure 5:
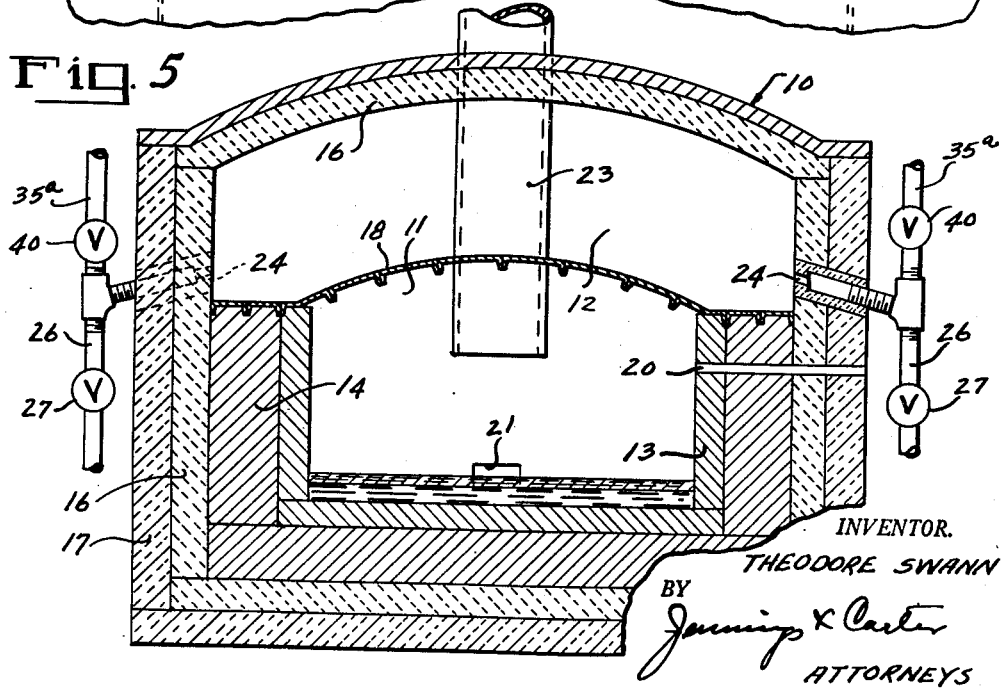
Fig. 5 is a sectional view taken along the line V—V of Fig. 1.

The entire heat exchanger and conveyer unit 31 rotates together and is supported by a plurality of riding rings 44 which rotatably engage double flanged rollers 46 positioned at each end of the unit and on each side thereof, as shown in Figs. 1 and 4. Each roller 46 is supported by a shaft 47 which is rotatably mounted in a suitable bearing 48.

The unit 31 is rotated by means of a sprocket 49 which surrounds one end of the unit. The sprocket 49 is operably connected to a motor 51 through a chain 52 and a reduction gear unit 53.

At each end of the heat exchanger and conveyer unit 31, the cylindrical tube 32 and the screw 33 extend past the end of the cylindrical tube 37 and the portion of the unit 31 outwardly of the tube 37. Surrounding the tube 32 and spaced outwardly from the end of the tube 37 opposite the free end of the unit 31 is a layer of insulating material 56 incased by a cylindrical wall 57 having inturned ends 58 and 59.

Surrounding the discharge end of the unit 31 at the point the tube 37 terminates is a stationary housing member 54 which slidably engages and extends between the outer surfaces of the walls 43 and 57. Secured to each side of the housing 54 by means of bolts 61 is a gland 60 with suitable packing material 62. The packing material, which may be asbestos or equivalent, provides an air tight joint between the housing and the walls 43 and 57. Communicating with the bottom of the housing 54 is the conduit 28 which conveys the products of combustion from the combustion chamber 12. From the above description of the housing assembly 54 it will be seen that the housing provides means for the products of combustion to be conveyed through the unit 31 in a direction countercurrent to, and out of direct contact with, the materials conveyed by the screw 33.

Incasing the discharge end of the screw 33 is a second stationary housing assembly 63 which slidably engages the outer surface of the wall 57 adjacent the end thereof and opposite the housing 54. Secured to the inner side of the housing 63 is a gland member 64, with suitable packing material 65 which provides a sealed connection between the housing and the wall 57. Communicating with the outer wall of the housing 63 is the conduit 22 which communicates with the reduction chamber 11. The gases from the reduction chamber 11 pass through the openings 36 in the screw conveyor in a direction countercurrent to the flow of the burden thus permitting the burden to be intimately mixed with the gases. Also communicating with the housing 63 through the bottom thereof is the conduit 23 which discharges the burden directly into the reducing chamber from the end of the screw 33.

Surrounding the feed end of the heat exchanger and conveyer unit 31 at the point the tube 37 terminates is a stationary housing member 66 which slidably engages the outer surface of the wall 43 and the outer surface of the tube 32 as at 67. Secured to each side of the housing 66 by means of bolts 68 is a gland member 69, similar to the gland members 60 and 64 and including suitable packing material 70. Communicating with the housing member 66 is a conduit 75 which in turn communicates with an exhaust fan 71 for discharging the products of combustion.

Incasing the feed end of the tube 32 and slidably engaging the outer surface thereof is a housing member 72. Secured to the inner sides of the housing 72 by means of bolts 73 is a gland member 74 having suitable packing material 80 which provides a seal between the housing 72 and the tube 32. Communicating with the housing 72 is a conduit 76 which is in turn connected to an exhaust fan 77. The exhaust fan 77 communicates with the conduit 26 by means of a conduit 78 having a regulating valve 79 therein, thus conveying the unused reducing gases to the combustion chamber to be burned therein.

Mounted adjacent the feed end of the unit 31 is a feed hopper 81 which communicates with the tube 32 by means of a conduit 82. The conduit 82 extends through the housing member 72 and discharges the burden into the tube 32 as at 85. A vibrating feeder 83 is mounted adjacent the bottom of the hopper 81 to provide an uninterrupted supply of the burden to the conduit 32. Inasmuch as the construction and operation of such feeders are well known, no detailed description thereof is deemed necessary.

From the foregoing description of my improved apparatus, the carrying out of my improved process may be readily understood. In preparing the burden, the ore to be reduced, carbon and a suitable flux are crushed to a fineness of approximately 8 mesh and mixed together. To prepare an iron ore burden, I mix the iron ore with carbon, such as coke or lignite char, and a flux such as calcined dolomite. The mixture of iron ore, carbon and flux is then cemented together with Portland cement as a binder, and crushed to a particle size of approximately $\frac{3}{8}$ of an inch thus providing a small size burden most intimately mixed, each piece containing its own ore, carbon and flux. The crushed particles are then passed over a $\frac{1}{16}$ inch screen and the fines returned to be mixed with more ore, carbon and flux.

The burden is placed in the hopper 81 where it is conveyed by means of the vibrating feeder 83 to the interior of the tube 32. The heat exchanger and conveyer 31 is rotated by the motor 51 thus causing the burden to be moved toward the discharge end of the screw 33.

The products of combustion leave the combustion chamber 12 at a temperature of approximately 3,000° F. and pass through the conduit 28 to the pre-heater 29 thus preheating the air which is supplied to the burners 24. In the preheater 29 the temperature of the combustion gases is reduced to approximately 2,000° F. The temperature at which the combustion gases leave the preheater may be accurately controlled by any suitable means such as the thermostatically controlled valve 84. From the preheater 29 the combustion gases enter the housing 54 and then pass through the flue ducts 39 defined by the radially extending fins 38. As the combustion gases pass through the unit 31 in a direction counter-current to the movement of the burden practically all of the remaining sensible heat in the combustion gases is utilized to preheat the burden.

The carbon monoxide and carbon dioxide gases which are liberated in the reduction chamber 11 and not used for reduction in the reduction chamber are conveyed through conduit 22 to the housing member 63. The gases then pass through the tube 32 in a direction countercurrent to the flow of the burden thus partially reducing and preheating the burden therein. As the gases pass over the conduit 23 a small amount thereof is blown down the conduit thereby preventing a back flow of gases through the conduit.

As the burden is conveyed by the archimedian screw 33 through the tube 32 it is mixed and dropped through the hot reducing gases twice for each foot of travel, thus reducing ferric oxide to magnetic oxide of iron, where iron ore is used. The preheated partially reduced ore then enters the reduction chamber 11 at approximately 1600° F. or just before it has reached the sticky stage. When iron ore is employed, the preheated partially reduced ore is almost in the form of sponge iron by the time it reaches the reduction chamber 11. If desired, the supply of carbon monoxide and the temperature within the tube 32 may be increased so as to reduce the burden to sponge iron by the time it reaches the discharge end of the screw conveyer 33. The carbon monoxide needed for increasing the reduction may be supplied by passing the spent reducing gases, released from the tube 32, over a hot bed of coke thereby regenerating carbon monoxide. About half of the reduction takes place outside of the furnace thereby greatly reducing the cost of reduction.

From the foregoing it will be apparent that I have devised an improved method and apparatus for the reduction of ores. By providing a thin arch roof of silicon carbide, the transfer of heat from the combustion chamber to the burden inside the reduction chamber is greatly increased, thus making it possible to heat the burden indirectly. The graphite lining 13 aids in heat distribution and the layer of carbon 14 stores heat to provide better temperature control.

The CO and $CO_2$ gases liberated from the carbon in the burden, are not diluted with tons of air as is the case in the blast furnace. Also, the CO and $CO_2$ gases are employed to partially reduce and preheat the burden before it enters the reduction chamber. By reducing the ore with carbon monoxide, which results in a slight gain in heat, I have provided a more economical method of reducing ores than the methods which employ carbon or hydrogen, in which heat must be supplied to keep the reaction going. If reduction of the iron oxide is by hydrogen there will be a small absorption of heat, with carbon a large absorption of heat, but with carbon monoxide the reaction is exothermic and there is a small evolution of heat.

It will also be seen from the foregoing description of my method and apparatus, that the temperature at which reduction takes place can be very accurately controlled thereby permitting selective reduction of ores.

While I have only described the reduction of iron ore burdens in the foregoing specification, it will be apparent that other ore burdens may be reduced. For example, a burden comprising phosphate rock, carbon and a suitable flux may be employed. Also, ores containing several metals may be reduced by my improved method of selective reduction.

While I have shown my invention in but one form, it will be obvious to those skilled in the art that it is not so limited, but is susceptible of various changes and modifications without departing from the spirit thereof, and I desire therefore, that only such limitations shall be placed thereupon as are specifically set forth in the appended claims.

What I claim is:

1. The method of reducing oxides of ore which comprises forming a burden consisting of the oxides to be reduced, carbon and a flux into a spirally moving column of the same, introducing said burden into intimate contact with carbon monoxide gas in a closed chamber, heating said closed chamber to maintain the oxides and gas therein within the temperature range required for reduction, passing excess carbon monoxide gas formed in said closed chamber countercurrent to and into intimate contact with said spirally moving burden thus partially reducing and preheating the ores prior to reaching said closed chamber.

2. The method of reducing oxides of ore as defined in claim 1 which comprises the further step of heating the closed chamber indirectly by means of a hydrocarbon fuel and passing the products of combustion in a direction countercurrent to and out of direct contact with said spirally moving column thereby preheating the burden.

3. The method of reducing oxides of ore as defined in claim 2 in which the products of combustion preheat the air for combustion prior to preheating said spirally moving column.

4. The method of reducing oxides of ore as defined in claim 2 in which the burden employed comprises phosphate rock, carbon and a suitable flux.

5. A method of reducing oxides of iron comprising, forming a burden consisting of oxides of iron, carbon and a flux into a spirally moving column of the same, introducing said burden into a closed chamber, heating indirectly with a hydrocarbon fuel said closed chamber to a temperature above the reaction temperature of carbon with the oxides of iron thus releasing carbon monoxide and carbon dioxide gases, passing said gases countercurrent to and into intimate contact with said spirally moving column thus partially reducing and preheating the oxides, and passing the products of combustion from said hydrocarbon fuel in a direction countercurrent to and out of direct contact with said spirally moving column thus pre-heating the burden.

6. The method of reducing oxides of iron as defined in claim 5 in which a portion of the burden is removed in the form of sponge iron at the point said burden is introduced into the closed chamber.

7. The method of reducing oxides of iron as defined in claim 5 which includes the further step of passing the spent reducing gases over a bed of hot coke thus regenerating carbon monoxide.

8. In apparatus for reducing oxides of ore, a reduction chamber, a combustion chamber adjacent to and in heat transfer relation to the reduction chamber and separated therefrom by a thin refractory wall, means introducing the ore to be reduced, carbon and flux into the reduction chamber, means conveying a portion of the gases released in the reduction chamber in a direction countercurrent to and into intimate contact with the burden prior to introducing the burden into the reduction chamber, and means conveying the combustion gases closely adjacent and in a direction countercurrent to and out of direct contact with said burden thereby preheating the burden.

9. In apparatus for reducing oxides of ore, a reduction chamber, a combustion chamber adjacent the reduction chamber heating indirectly said reduction chamber, means introducing a spirally moving burden comprising the ore to be reduced, carbon and a flux into said reduction chamber, means conveying the gases released in the reduction chamber and not utilized for reduction therein in a direction countercurrent to and in intimate contact with said spirally moving burden thereby partially reducing and aiding in preheating said burden, and means conveying the products of combustion from the combustion chamber in a direction countercurrent to and out of direct contact with said moving burden thus further preheating the burden.

10. In apparatus for reducing oxides of ore, a smelting furnace comprising an outer wall of insulation material, a wall of refractory material adjacent said outer wall, a combustion chamber in the upper portion of the smelting furnace, means supplying fuel to said combustion chamber, a reduction chamber in the lower portion of said furnace, a thin refractory wall separating the combustion chamber from the reduction chamber, means introducing a burden comprising the ore to be reduced, carbon and a flux at the top of said reduction chamber, means conveying a portion of the gases released in said reduction chamber in a direction countercurrent to and into intimate contact with the burden prior to introducing the burden into the reduction chamber, and means conveying the combustion gases in a direction countercurrent to and out of direct contact with said burden thereby preheating the burden.

11. Apparatus for reducing oxides of ore as defined in claim 10 in which fuel is supplied to the combustion chamber by means of a plurality of gas burners extending inwardly of said combustion chamber from the sides thereof.

12. Apparatus as defined in claim 10 in which the gases released from the reduction chamber are burned in the combustion chamber after passing in intimate contact with the burden.

13. In apparatus for reducing oxides of ore including a combined heat exchanger and conveyor unit in the form of a cylindrical tube having a screw conveyor non-rotatably mounted therein and means for rotating the tube, the combination of a second concentric cylindrical tube larger in diameter and rigidly secured to said first mentioned tube, a reduction chamber, a combustion chamber adjacent the reduction chamber and separated therefrom by a thin refractory wall, means for burning a hydrocarbon fuel in said combustion chamber, means introducing a burden comprising the ore to be reduced, carbon and a flux at the feed end of said screw conveyer, a conduit conveying said burden from the discharge end of said screw conveyer to the reduction chamber, a conduit conveying gases released from the reduction chamber to the discharge end of said first mentioned tube, a rotary seal between said conduit conveying the gases from the reduction chamber to the discharge end of said first mentioned tube, a conduit conveying the combustion gases from the combustion chamber to the space defined between said first and second mentioned tubes, a rotary seal between said conduit for the combustion gases and the outer wall of the heat exchanger and conveyer unit, means to remove the gases from the first mentioned tube adjacent the feed end of said unit, and means to remove the combustion gases from said unit inwardly of the point the gases are removed from the first mentioned tube.

14. Apparatus as defined in claim 13 in which the means introducing the burden at the feed end of the screw conveyer comprises a hopper, a vibrating feeder mounted adjacent the lower end of said hopper and a conduit conveying the burden from said hopper to the screw conveyer.

15. Apparatus as defined in claim 13 which the means to remove the gases from the first mentioned tube comprises a housing surrounding said tube, a packing gland between said tube and the housing and a discharge conduit communicating with said housing.

16. Apparatus as defined in claim 13 in which the means to remove the combustion gases from the heat exchanger and conveyer unit comprises a housing surrounding said second mentioned tube adjacent the feed end of said unit, a packing gland between the housing and the outer surface of said unit, a second packing gland between the housing and the outer surface of said first mentioned tube and a discharge conduit communicating with said housing.

17. Apparatus as defined in claim 13 in which the rotary seal between the conduit conveying the gases from the reduction chamber and the discharge end of said first mentioned tube comprises a housing communicating with said conduit conveying the gases from the reduction chamber and surrounding the discharge end of said first mentioned tube, and a packing gland between said housing and the first mentioned tube.

18. Apparatus as defined in claim 13 in which the rotary seal between the conduit for the combustion gases and the outer wall of the heat exchanger and conveyer unit comprise, a housing communicating with the conduit from the combustion chamber and surrounding said unit adjacent the end of said second mentioned tube oposite the feed end of the unit, a packing gland between said housing and the outer wall of the unit, and a second packing gland between the housing and the outer surface of the first mentioned tube.

19. In apparatus for reducing oxides of ore including a combined heat exchanger and conveyer in the form of a cylindrical tube having a helical conveyer non-rotatably mounted therein and means for rotating the tube, the combination of a reduction chamber, a combustion chamber adjacent the reduction chamber and separated therefrom by a thin refractory wall, means for burning a hydrocarbon fuel in said combustion chamber, a second concentric cylindrical tube spaced from and rigidly secured to said first mentioned tube by longitudinally extending radial fins, means introducing a burden comprising the ore to be reduced, carbon and a flux into the feed end of said first mentioned tube, a conduit conveying said burden from the discharge end of said helical conveyer to said reduction chamber, a conduit conveying excess reduction gases from the reduction chamber to the discharge end of said first mentioned tube, and a conduit conveying the combustion gases from the combustion chamber to the space defined between said first and second mentioned cylindrical tubes.

THEODORE SWANN.

REFERENCES CITED

The following references are of record in the file of this patent:

UNITED STATES PATENTS

| Number | Name | Date |
|---|---|---|
| 233,568 | Southan | Oct. 19, 1880 |
| 1,452,627 | Thornhill | Apr. 24, 1923 |
| 1,904,548 | Schultze | Apr. 18, 1933 |
| 1,920,379 | Greene | Aug. 1, 1933 |